(12) United States Patent
Krawczyk et al.

(10) Patent No.: US 9,823,424 B2
(45) Date of Patent: Nov. 21, 2017

(54) FERRULE ASSEMBLY FOR A FIBER OPTIC CONNECTOR

(71) Applicant: Corning Optical Communications LLC, Hickory, NC (US)

(72) Inventors: Jakub Krawczyk, Łódź (PL); Daniel Leyva, Jr., Arlington, TX (US); Robert Max Sanetick, Denver, NC (US); Hieu Vinh Tran, Charlotte, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/440,330

(22) Filed: Feb. 23, 2017

(65) Prior Publication Data
US 2017/0160486 A1    Jun. 8, 2017

Related U.S. Application Data

(63) Continuation of application No. PCT/US2015/052605, filed on Sep. 28, 2015.

(60) Provisional application No. 62/059,277, filed on Oct. 3, 2014.

(51) Int. Cl.
*G02B 6/36* (2006.01)
*G02B 6/38* (2006.01)

(52) U.S. Cl.
CPC ........... *G02B 6/383* (2013.01); *G02B 6/3821* (2013.01); *G02B 6/3882* (2013.01); *G02B 6/3885* (2013.01); *G02B 6/3887* (2013.01); *G02B 6/3893* (2013.01); *G02B 6/3898* (2013.01)

(58) Field of Classification Search
CPC .... G02B 6/383; G02B 6/3821; G02B 6/3898; G02B 6/3885; G02B 6/3893; G02B 6/3887; G02B 6/3882
See application file for complete search history.

(56) References Cited

U.S. PATENT DOCUMENTS 7,006,738 B2    2/2006  Grabbe
8,636,424 B2 *  1/2014  Kuffel ................... G02B 6/383
                                                       385/78

(Continued)

FOREIGN PATENT DOCUMENTS

EP          1016885 A1    7/2000
EP          1020745 A2    7/2000
WO       2006029299 A2    3/2006

OTHER PUBLICATIONS

PCT International Search Report, PCT/US2015/052605, dated Sep. 28, 2015, 4 pages.

*Primary Examiner* — Ellen Kim
(74) *Attorney, Agent, or Firm* — Adam R. Weeks (57) ABSTRACT

A ferrule assembly for a fiber optic connector includes a ferrule having a first portion defining a front end face and a second portion defining a shoulder offset from the front end face in a longitudinal direction. The ferrule assembly also includes a pin retainer received over the first portion of the ferrule and at least one guide pin projecting from a first surface of the pin retainer. The pin retainer can be removed from the ferrule, rotated to a reverse orientation, and re-installed on the ferrule to switch the ferrule assembly from a male configuration to a female configuration.

20 Claims, 7 Drawing Sheets

(56) References Cited

U.S. PATENT DOCUMENTS

2002/0186932 A1 12/2002 Barnes et al.
2012/0099822 A1 4/2012 Kuffel et al.

\* cited by examiner

FERRULE ASSEMBLY FOR A FIBER OPTIC CONNECTOR

PRIORITY

This application is a continuation of PCT/US2015/052605, filed on Sep. 28, 2015, which claims the benefit of priority of U.S. Provisional Application Ser. No. 62/059,277, filed on Oct. 3, 2014. The content of these applications is relied upon and incorporated herein by reference in its entirety.

BACKGROUND

This disclosure relates generally to optical fibers, and more particularly to ferrule assemblies for fiber optic connectors and methods for changing the gender configuration of such ferrule assemblies and fiber optic connectors.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, optical connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" connectors).

Many different types of optical connectors exist. In environments that require high density interconnects and/or high bandwidth, such as data centers, multi-fiber optical connectors are the most widely used. One example is the multi-fiber push on (MPO) connector, which incorporates a mechanical transfer (MT) ferrule and standardized according to TOA-604-5 and IEC 61754-7. These connectors can achieve a very high density of optical fibers, which reduces the amount of hardware, space, and effort to establish a large number of interconnects.

The end faces of MPO ferrules are aligned by the use of precision guide pins. One connector in the mated pair has guide pins protruding from the MT ferrule ("male configuration"); the other connector has two guide pin holes in the MT ferrule ("female configuration"). The guide pins on the male connector insert into the guide pin holes on the female connector, thereby aligning optical fibers terminated by the two connectors so that an optical connection can be established.

Generally, the MT ferrules for the different gender configurations of MPO connectors have the same construction but for the presence of the guide pins within (and extending from) the guide pin holes in the male configuration. The guide pins are typically retained by a component positioned rearward of the MT ferrule within a housing of the connector. Thus, the guide pins are installed during the assembly of the connector when the back end of the MT ferrule remains accessible before the ferrule is inserted into the housing. If a technician in the field needs an MPO connector with a female configuration but only has a male configuration, he or she must partially disassemble the connector to access the component that retains the guide pins so that the guide pins can be removed. The opposite is also true; if a technician in the field needs an MPO connector with a male configuration but only has a female configuration, he or she must partially disassemble the connector to properly install the guide pins. The disassembly can be time-consuming and difficult, may require a special removal tool, and risks damage to the optical fibers.

SUMMARY

Embodiments of ferrule assemblies, along with fiber optic connectors, cable assemblies, and methods including the ferrule assemblies, are disclosed below. According to one embodiment, a ferrule assembly includes a ferrule, a pin retainer, and a guide pin. The ferrule extends in a longitudinal direction and has a first portion defining a front end face and a second portion defining a shoulder offset from the front end face in the longitudinal direction. The pin retainer is received over or proximate the first portion of the ferrule between the front end face and the shoulder. The guide pin is coupled to or integral with the pin retainer. The pin retainer can be removed from the ferrule, rotated to a reverse orientation, and re-installed on the ferrule to switch the ferrule assembly from a male configuration in which the guide pin extends past a plane including the front end face of the ferrule to a female configuration in which the guide pin extends into or along the second portion of the ferrule.

According to another embodiment, a ferrule assembly includes a ferrule, a pin retainer, and a guide pin. The ferrule extends in a longitudinal direction and has a first portion defining a front end face and a second portion defining a shoulder offset from the front end face in the longitudinal direction. The pin retainer is received over or proximate the first portion of the ferrule between the front end face and the shoulder. The guide pin is coupled to or integral with the pin retainer and projects from a first surface of the pin retainer, which also includes a second surface opposite the first surface. In a male configuration of the ferrule assembly, the first surface of the pin retainer faces a forward direction, the second surface of the pin retainer interfaces with the shoulder of the ferrule, and the at least one guide pin extends beyond a plane including the front end face of the ferrule. In a female configuration of the ferrule assembly, the second surface of pin retainer faces a forward direction, the first surface of the pin retainer interfaces with the shoulder of the ferrule, and the at least one guide pin extends into or along the second portion of the ferrule.

It should be noted that the use of "a" or "an" when referring to an element is intended to mean "at least one"; it is not intended to exclude pluralities (i.e., not intended to be limited to the singular sense). In some embodiments, for example, there may be multiple pin retainers, guide pins, and/or shoulders.

Fiber optic connectors and cable assemblies including ferrule assemblies like the ones mentioned above are also disclosed. For example, a fiber optic connector according to one embodiment includes a housing and one of the ferrule assemblies, with the ferrule assembly being at least partially received in the housing. The pin retainer of the ferrule assembly can be changed from the male configuration to the female configuration without removing the ferrule of the ferrule assembly from the housing.

Finally, methods of changing the gender configuration of a fiber optic connector are also disclosed. The fiber optic connector includes a housing and one of the ferrule assemblies mentioned above, with the ferrule assembly being at least partially received in the housing. The method involves switching the ferrule assembly from the male configuration to the female configuration, or vice-versa, while the ferrule of the ferrule assembly is retained in the housing. For example, the switch may involve removing the pin retainer from the ferrule and housing, rotating the pin retainer 180 degrees, and then positioning the pin retainer back on or proximate the first portion of the ferrule.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figures 1, 2:
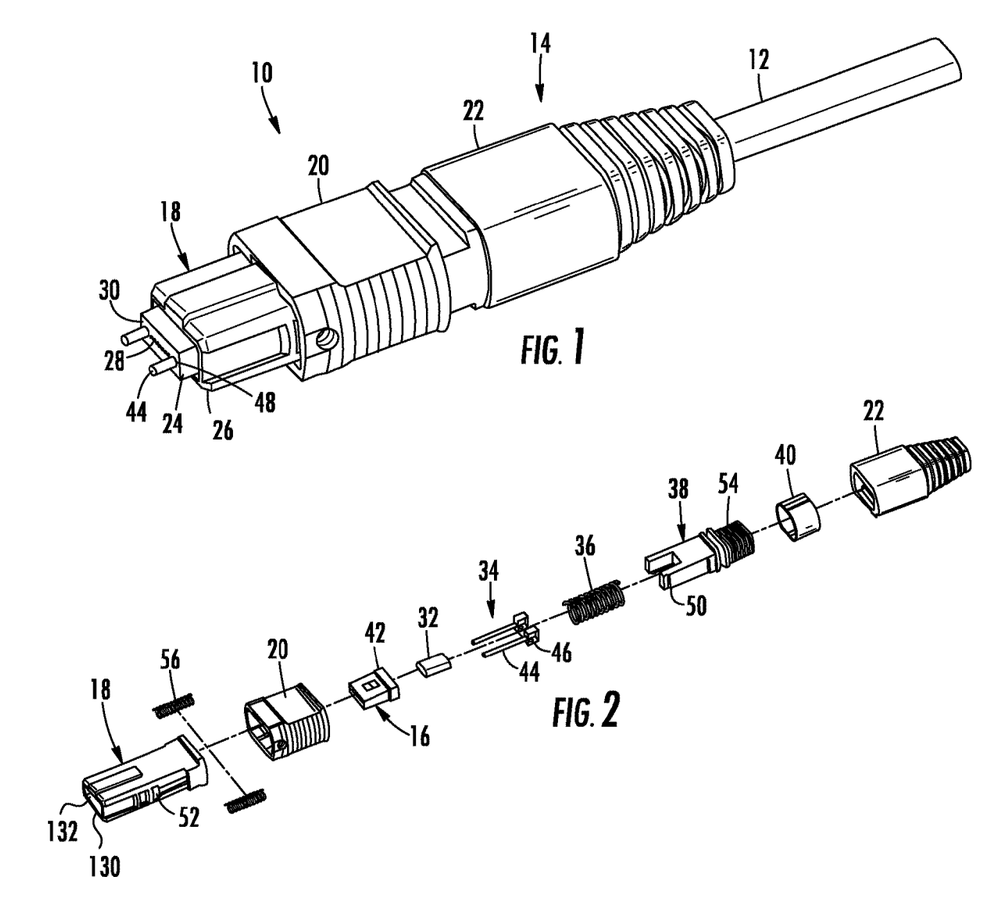
FIG. 1 a perspective view of an example of a fiber optic connector.
FIG. 2 is an exploded perspective view of the fiber optic connector of FIG. 1.

Various embodiments will be further clarified by examples in the description below. In general, the description relates to multi-fiber ferrules, along with fiber optic connectors, cable assemblies, and methods incorporating such multi-fiber ferrules. The fiber optic connectors may be based on known connector designs, such as MPO connectors. To this end, FIGS. 1 and 2 illustrate a fiber optic connector 10 (also referred to as "optical connector" or simply "connector") in the form of a MTP® connector, which is particular type of MPO connector (MTP® is a trademark of US Conec Ltd.). A brief overview of the connector 10 will be provided to facilitate discussion, as the multi-fiber ferrules and other components shown in subsequent figures may be used in connection with the same type of connector. However, persons skilled in the field of optical connectivity will appreciate that the connector 10 is merely an example, and that the general principles disclosed with respect to the multi-fiber ferrules and other components shown in subsequent figures may also be applicable to other connector designs.

As shown in FIG. 1, the connector 10 may be installed on a fiber optic cable 12 ("cable") to form a fiber optic cable assembly 14. The connector includes a ferrule 16, a housing 18 received over the ferrule 16, a slider 20 received over the housing 18, and a boot 22 received over the cable 12. The ferrule 16 is spring-biased within the housing 18 so that a front portion 24 of the ferrule 16 extends beyond a front end 26 of the housing 18. Optical fibers (not shown) carried by the cable 12 extend through bores/micro-holes 28 in the ferrule 16 before terminating at or near an end face 30 of the ferrule 16. The optical fibers are secured within the ferrule 16 using an adhesive material (e.g., epoxy) and can be presented for optical coupling with optical fibers of a mating component (e.g., another fiber optic connector; not shown) when the housing 20 is inserted into an adapter, receptacle, or the like.

As shown in FIG. 2, the connector 10 also includes a ferrule boot 32, guide pin assembly 34, spring 36, retention body 38 (also referred to as a crimp body 38), and crimp ring 40. The ferrule boot 32 is received in a rear portion 42 of the ferrule 16 to help support the optical fibers extending to the ferrule bores 28 (FIG. 1). The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 16, and the guide pins 44 extend through pin holes 48 (FIG. 1) provided in the ferrule 16 so as to project beyond the front end face 30.

Both the ferrule 16 and guide pin assembly 34 are biased to a forward position relative to the housing 18 by the spring 36. More specifically, the spring 36 is positioned between the pin keeper 46 and a portion of the crimp body 38. The crimp body 38 is inserted into the housing 18 when the connector 10 is assembled and includes latching arms 50 that engage recesses 52 in the housing 18. The spring 36 is compressed by this point and exerts a biasing force on the ferrule 16 via the pin keeper 46. The rear portion 42 of the ferrule defines a flange that interacts with a shoulder or stop formed within the housing 18 to retain the rear portion 42 within the housing 18.

In a manner not shown in the figures, aramid yarn or other strength members from the cable 12 are positioned over an end portion 54 of the crimp body 38 that projects rearwardly from the housing 18. The aramid yarn is secured to the end portion 54 by the crimp ring 40, which is slid over the end portion 54 and deformed after positioning the aramid yarn. The boot 22 covers this region, as shown in FIG. 1, and provides strain relief for the optical fibers by limiting the extent to which the connector 10 can bend relative to the cable 12. The word "PUSH" is printed on the boot 22 in the embodiment shown to help direct a user to grasp the boot 22 when inserting the connector 10 into an adapter or receptacle, thereby allowing the housing to be fully inserted for proper engagement/mating with the adapter or receptacle. The word "PULL" is printed on the slider 20, which may be biased by springs 56 (FIG. 2) relative to the housing 18, to help direct a user to grasp the slider 20 when disengaging the connector 10 from an adapter or receptacle. This way pull forces are transferred directly to the housing 18 (rather than the cable 12) to disengage the housing 18 from the adapter or receptacle.

Now that a general overview of the connector 10 has been provided, various modifications will be described that provide an alternative to the guide pin assembly 34. The guide pin assembly 34 in FIGS. 1 and 2 has a conventional design and generally cannot be accessed without using a tool to partially disassemble the connector 10. The alternatives involve new ferrule assemblies intended to be used instead of both the ferrule 16 and guide pin assembly 34. The ferrule assemblies allow the fiber optic connector to be switched from a male configuration to a female configuration, or vice-versa, without removing a ferrule of the ferrule assembly from a housing of the fiber optic connector. The connector 10 will be referred to as an example of a fiber optic connector incorporating the ferrule assemblies to facilitate discussion.

To this end, FIGS. 3-7 illustrate one embodiment of a ferrule assembly 60 including a ferrule 62, a pin retainer 64, and first and second guide pins 66a, 66b (generically referred to as "guide pins 66"). The ferrule 62 extends in a longitudinal direction and has a first portion 68 defining a front end face 70. A plurality of bores/micro-holes 72 extend into the ferrule 62 from the front end face 70 and communicate with an opening in a back end 74 of the ferrule 62. Each micro-hole 72 is configured to receive an optical fiber (not shown) that is inserted from the back end 74 of the ferrule 62. The optical fibers can be secured inside a cavity 76 of the ferrule 62 by introducing adhesive through a window/opening 78 in the first portion 68. The ferrule 62 also includes a second portion 80 defining a shoulder 84 offset from the front end face 70 in the longitudinal direction. The shoulder 84 itself defines a forward-facing surface in the embodiment shown and may be part of the flange that retains the ferrule 62 within the housing 18 when the connector 10 is assembled, or may be located forward relative to the flange.

The pin retainer 64 includes an opening 90 extending between opposed first and second surfaces 92, 94. The opening 90 allows the pin retainer 64 to be received over the first portion 68 of the ferrule 62 between the front end face 70 and the shoulder 84.

Figure 3:
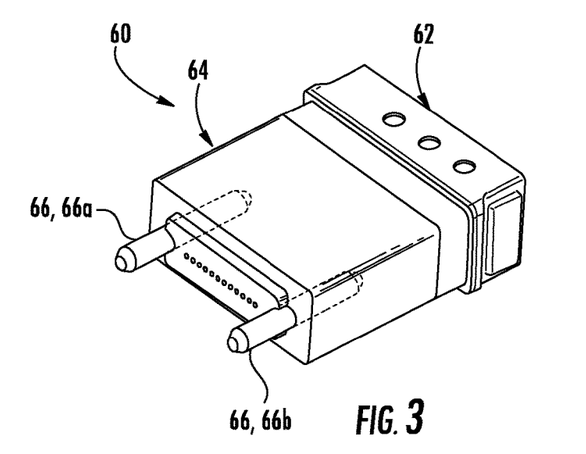
FIG. 3 is a perspective view of one embodiment of a ferrule assembly for a fiber connector, such as the fiber optic connector of FIG. 1, with the ferrule assembly being shown in a male configuration.
Figure 4:
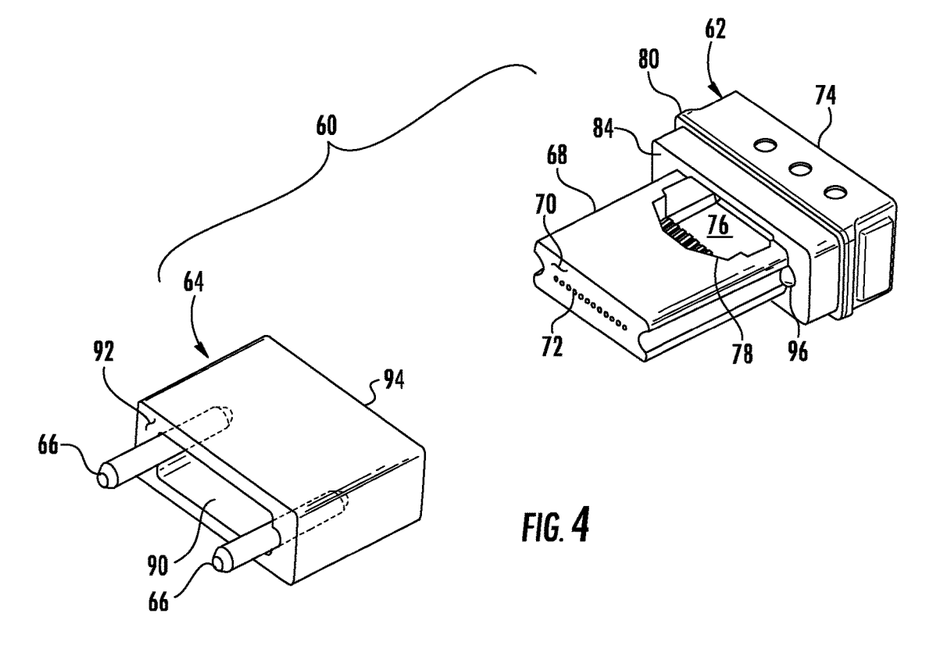
FIG. 4 is an exploded perspective view of the ferrule assembly of FIG. 3.
Figure 5:
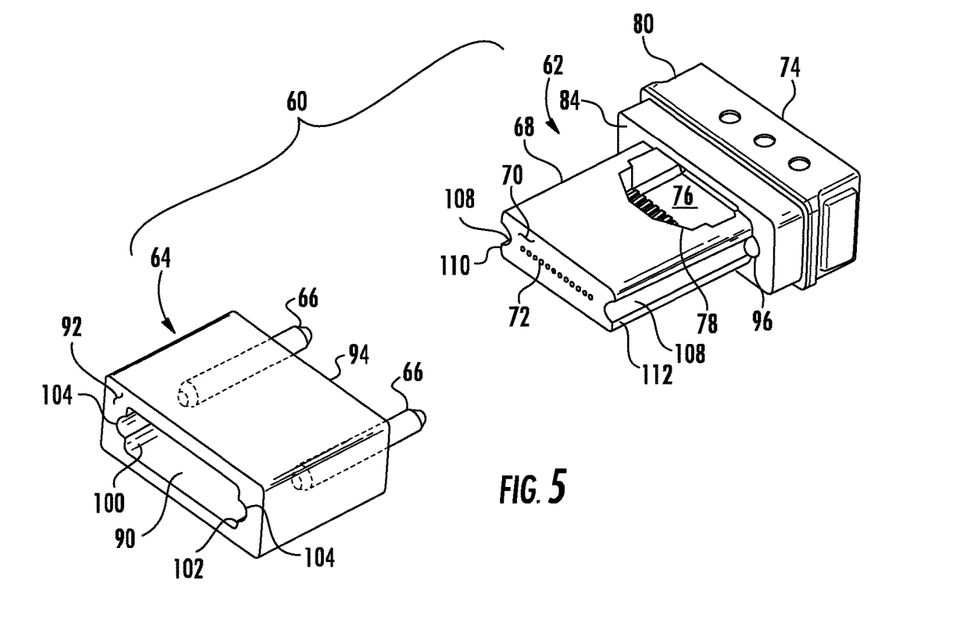
FIG. 5 is an exploded perspective view similar to FIG. 4, but showing a pin retainer of the ferrule assembly rotated 180 degrees.
Figure 6:
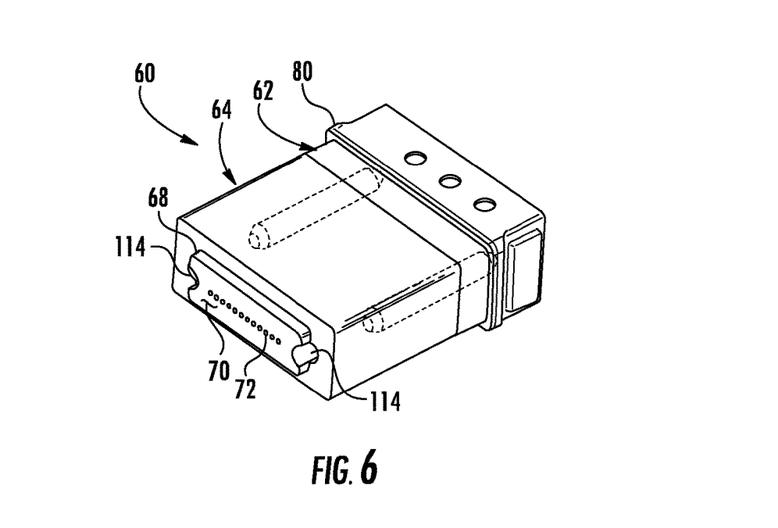
FIG. 6 is a perspective view of the ferrule assembly of FIG. 3 in a female configuration.

In general, FIG. 3 illustrates the ferrule assembly 60 in a male configuration (and, therefore, represents the connector 10 in a male configuration when the ferrule assembly 60 is used in the connector 10). In this configuration, the first surface 92 of the pin retainer 64 faces a forward direction and the second surface 94 interfaces with the shoulder 84 of the ferrule 62. The guide pins 66 extend from the first surface 92 to beyond a plane including the front end face 70 of the ferrule 62. When the pin retainer 64 is removed from the ferrule 62 (FIG. 4), rotated 180 degrees (FIG. 5), and positioned back on the first portion 68 of the ferrule 62 (FIG. 6), the ferrule assembly 60 is in a female configuration. In this configuration, the second surface 94 of the pin retainer 64 faces a forward direction and the first surface 92 interfaces with the shoulder 84 of the ferrule 62. The guide pins 66 extend into pin holes 96 in the second portion 80 of the ferrule 62.

The guide pins 66 extend from within the pin retainer 64 in the embodiment shown. More specifically, the pin retainer 64 includes opposed first and second inner surfaces 100, 102 that define a portion of the opening 90. The first and second inner surfaces 100, 102 each include a respective channel 104 extending across their lengths (i.e., extending in a longitudinal direction between the first and second surfaces 92, 94). The guide pins 66 are partially received in the channels 104. Thus, a portion of each channel 104 is occupied by one of the guide pins 66, while another portion of each channel 104 is empty.

The guide pins 66 are not only received in the channels 104, but also secured therein. Different ways for securing the guide pins 66 will be appreciated. For example, the guide pins 66 may be secured by a friction fit, snap-fit, adhesive, over-molding the pin retainer, etc. In the embodiment shown, the channels 104 have geometry that substantially corresponds to portions of the guide pins 66. In particular, the channels 104 have a semi-cylindrical shape (i.e., semi-circular in cross-section) that complements the cylindrical shape of the guide pins 66.

Similar channels 108 are provided on side surfaces 110, 112 of the ferrule 62 that extend between the front end face 70 and the shoulder 84. Like the channels 104, the channels 108 have a semi-cylindrical shape. When the pin retainer 64 is received over the first portion 68 of the ferrule 62, the guide pins 66 are partially received in channels 108 as well. In effect, the channels 108 in the ferrule 62 and the channels 104 in the pin retainer 64 together define effective/joint pin holes 114 having portions occupied by the guide pins 66. The joint pin holes 114 are aligned with the pin holes 96 that extend into the second portion 80 of the ferrule 62 from the shoulder 84. Empty/unoccupied portions of the joint pin holes 114 are positioned behind the guide pins 66 in the male configuration of the ferrule assembly 60 (FIG. 3). In the female configuration (FIG. 6), the empty portions are positioned in front of the guide pins 66, which extend into the pin holes 96. This allows the ferrule assembly 60 to be mated to another ferrule assembly (not shown) that is in the male configuration. The guide pins from that other ferrule assembly can extend into the empty portions of the joint pin holes 114 to align the ferrules (and, therefore, micro-holes) of the two ferrule assemblies.

The pin retainer 64 is retained on the first portion 68 of the ferrule 62 only by friction in the embodiment shown. Alternatively or additionally, the pin retainer 64 and ferrule 62 may include complementary engagement features for this purpose (e.g., at least one latch, detent, ball-plunger, or the like on one component and shoulders, recesses, sockets, or other complementary geometry on the other component; not shown). Regardless, the pin retainer 64 is removable from the ferrule 62 so that the pin retainer 64 can be reversed and then re-installed to change the gender configuration of the ferrule assembly 60 (and, therefore, the gender configuration of the connector 10). The pin retainer 64 may be considered as a "nose piece" that slides on and off the first portion 68 of the ferrule 62.

Figure 7:
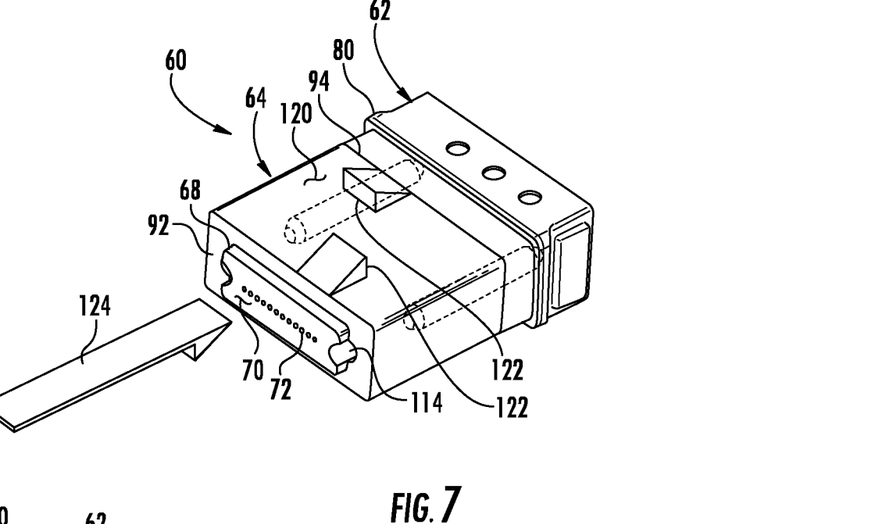
FIG. 7 is a perspective view of a ferrule assembly according to another embodiment and schematically illustrates how a tool may be used to engage a pin retainer of the ferrule assembly to facilitate changing from a male configuration to a female configuration, or vice-versa.

The removal and re-installation of the pin retainer 64 may be accomplished by hand or with a tool. For example, FIG. 7 illustrates an embodiment where the pin retainer 64 includes an outer surface 120 extending between the first and second surfaces 92, 94 and projections, recesses, or other engagement features 122 on the outer surface 120. The engagement features 122 make the pin retainer 64 easier to engage with a tool 124, which is shown schematically in FIG. 7, so that the tool 124 can be used to pull the pin retainer 64 off the first portion 68 of the ferrule 62.

Although the housing 18 (FIGS. 1 and 2) is not shown in FIG. 7, it will be appreciated how the pin retainer 64 may be accessed while the ferrule 62 is retained in the housing 18. For example, one engagement feature 122 may be positioned close to the first surface 92 so as to be on a portion of the pin retainer 64 that is located outside of the housing 18 when the connector 10 is assembled with a male configuration. Similarly, one engagement feature 122 may be positioned close to the second surface 94 so as to be on a portion of the pin retainer 64 that is located outside of the housing 18 when the connector 10 has a female configuration. In other embodiments, the engagement feature(s) on the pin retainer 64 may be positioned within the housing 18. In such embodiments, the tool 124 may be inserted through a front opening 130 (FIGS. 1 and 2) of the housing 18, into a space between the outer surface 120 of the pin retainer 64 and an inner surface 132 of the housing 18, and thereafter engage the engagement feature(s). Embodiments will also be appreciated where the housing 18 includes a front end, a back end, a cavity extending between the front and back ends, and at least one opening extending through an outer surface of the housing into the cavity. The tool in such embodiments may be inserted through the opening in the outer surface housing to engage the pin retainer 64.

Now referring to FIGS. 8-15, a ferrule assembly 150 according to an alternative embodiment is shown. The same reference numbers will be used to refer to elements corresponding to those in the ferrule assembly 60. Only the differences with respect to the elements will be described to avoid repetition.

Like the ferrule assembly 60, the ferrule assembly 150 includes a ferrule 62, a pin retainer 64, and guide pins 66. The ferrule 62 still includes the first portion 68 defining the front end face 70 and the second portion 80 defining a shoulder 84. It should be noted that the ferrule 62 is shown schematically and that aspects not pertaining to the interaction with the pin retainer 64 and guide pins 66 may be similar to the ferrule in FIGS. 3-7, or even the ferrule 16 (FIGS. 1 and 2). Thus, although not shown, it will be appreciated how there may be a window on the outer surface of the ferrule 62 to apply adhesive to optical fibers inserted into the ferrule 62, and how the second portion 80 of the ferrule 62 may define a flange (like the rear portion 42 of the ferrule 16) to retain the ferrule 62 in the housing 18 when the ferrule assembly 150 is used in the connector 10.

The ferrule 62 and pin retainer 64 differ from the embodiment in FIGS. 3-7 in that neither includes channels to jointly define pin holes when placed together. Instead, the pin retainer 64 in FIGS. 8-11 includes pin holes 160 extending between the first and second surfaces 92, 94. The guide pins 66 are secured within the pin holes 160 and project beyond the first surface 92 of the pin retainer 64. However, the guide pins 66 only occupy portions of the pin holes 160 such that other portions of each pin hole 160 are empty. Different ways for securing the guide pins 66 will once again be appreciated (e.g., friction fit, snap-fit, adhesive, over-molding, etc.).

Another difference from the embodiment in FIGS. 3-7 is that the pin retainer 64 includes counter-bores 170 in the first and second surfaces 92, 94 at the pin holes 160. Additionally, the shoulder 84 of the ferrule 62 includes bosses 172 that are received in the counter-bores 170 on the first surface 92 or second surface 94 of the pin retainer 64, depending on the gender configuration of the ferrule assembly 150. The pin holes 96 in the ferrule 62 extend into the second portion 80 from the bosses 172 and, therefore, are aligned with the pin holes 160 in the pin retainer 64.

Figure 8:
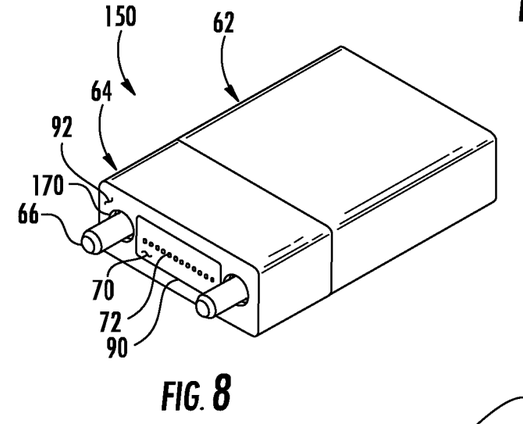
FIG. 8 is a perspective view of another embodiment of ferrule assembly for a fiber connector, such as the fiber optic connector of FIG. 1, with the ferrule assembly being shown in a male configuration.
Figure 12:
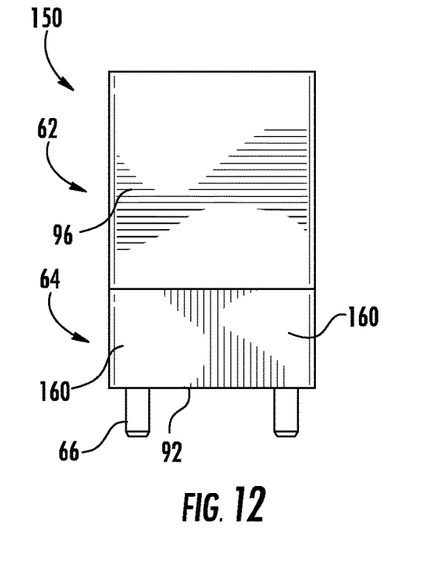
FIGS. 12-15 are top views corresponding to FIGS. 8-11.

The ferrule assembly 150 functions in a manner similar to the ferrule assembly 60. For example, FIGS. 8 and 12 illustrate the ferrule assembly 150 in a male configuration (and, therefore, represents the connector 10 in a male configuration when the ferrule assembly 150 is used in the connector 10). In this configuration, the first surface 92 of the pin retainer 64 faces a forward direction and the second surface 94 interfaces with the forward-facing surface defined by the shoulder 84 of the ferrule 62. The bosses 172 are received in the counter-bores 170 on the second surface 94. If desired, a friction fit may be provided between the bosses 172 and counter-bores 170 to help retain the pin retainer 64 on the ferrule 62. On the opposite side of the pin retainer 64, the guide pins 66 extend from the first surface 92 to beyond a plane including the front end face 70 of the ferrule 62.

Figure 9:
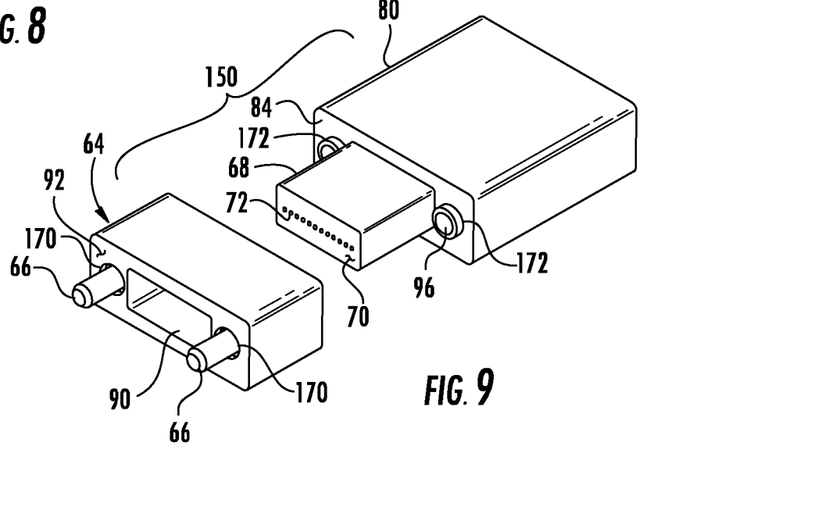
FIG. 9 is an exploded perspective view of the ferrule assembly of FIG. 8.
Figure 10:
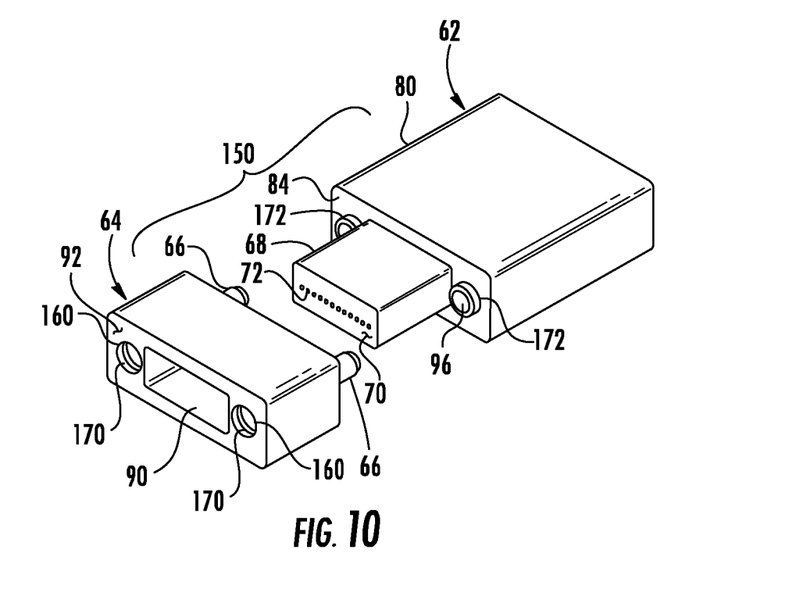
FIG. 10 is an exploded perspective view similar to FIG. 9, but showing a pin retainer of the ferrule assembly rotated 180 degrees.
Figure 11:
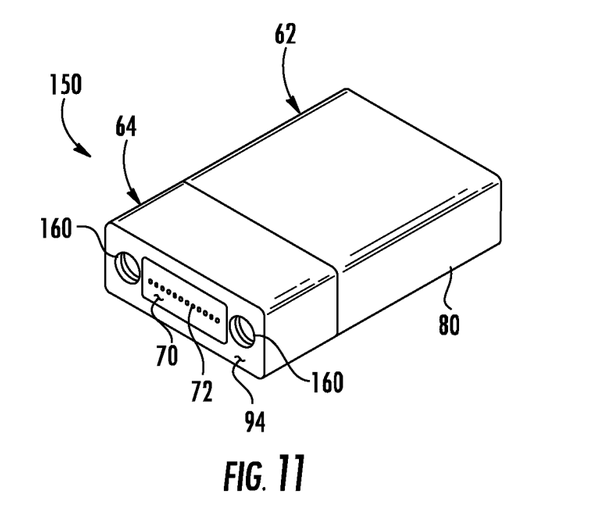
FIG. 11 is a perspective view of the ferrule assembly of FIG. 8 in a female configuration.
Figure 13:
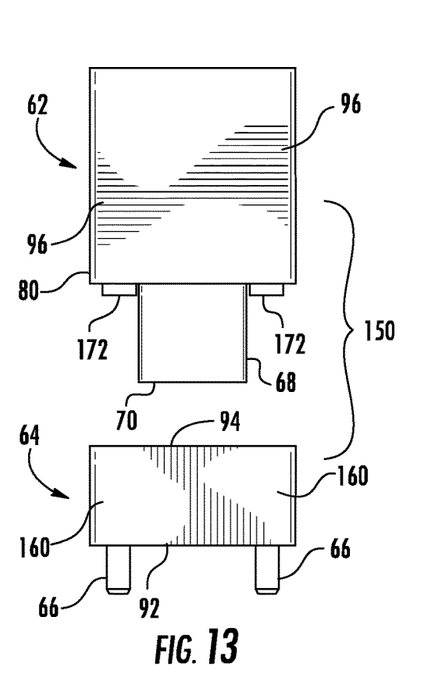
Figure 14:
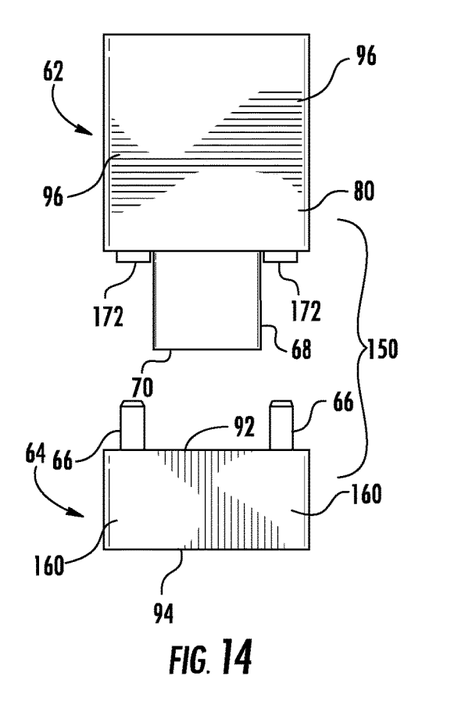
Figure 15:
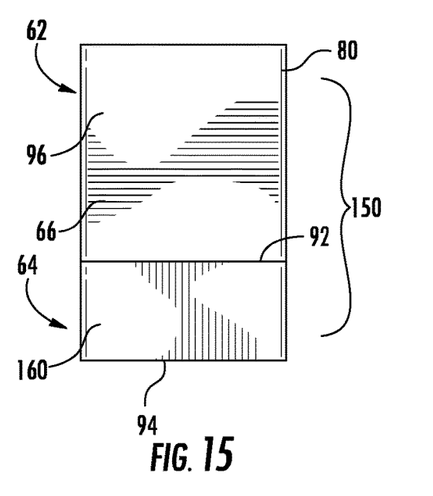

FIGS. 9 and 13 illustrate the pin retainer 64 being removed from the first portion 68 of the ferrule 62. Again, such removal be accomplished in a manner similar to that described above with reference to the ferrule assembly 60. FIGS. 10 and 14 then illustrate the pin retainer 64 rotated 180 degrees to be placed in a reverse orientation. Finally, FIGS. 11 and 15 illustrate the pin retainer 64 installed back on the first portion 68 the ferrule 62. The second surface 94 of the pin retainer 64 and empty portions of the pin holes 160 now face a forward direction such that the ferrule assembly 150 is now in a female configuration. The first surface 92 of the pin retainer 64 interfaces with the shoulder 84, and the guide pins 66 extend into the pin holes 96.

Figure 16:
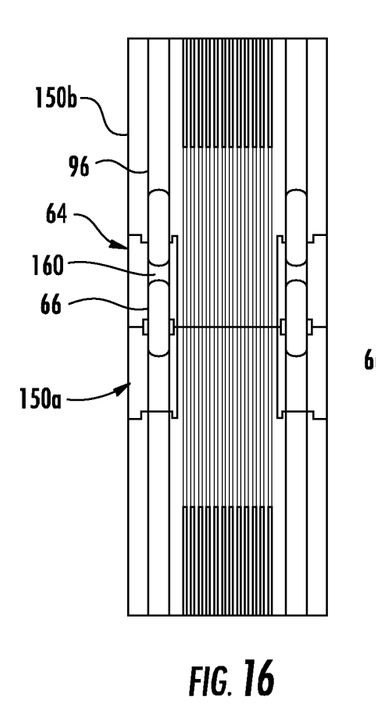
FIG. 16 is a schematic top view of the ferrule assembly of FIG. 8, in the male configuration, mated with a similar ferrule assembly in the female configuration.

FIG. 16 shows two of the ferrule assemblies 150, namely a first ferrule assembly 150*a* in the male configuration and a second ferrule assembly 150*b* in the female configuration. As can be seen, the first and second ferrule assemblies 150*a*, 150*b* can be mated together with the guide pins 66 of the first ferrule assembly being received in the pin holes 160 in the pin retainer 64 of the second ferrule assembly 150*b*. The front end faces 70 of the ferrules 62 contact (or nearly contact) each other so that optical fibers secured in their micro-holes 72 also contact, thereby establishing an optical connection.

Figure 17:
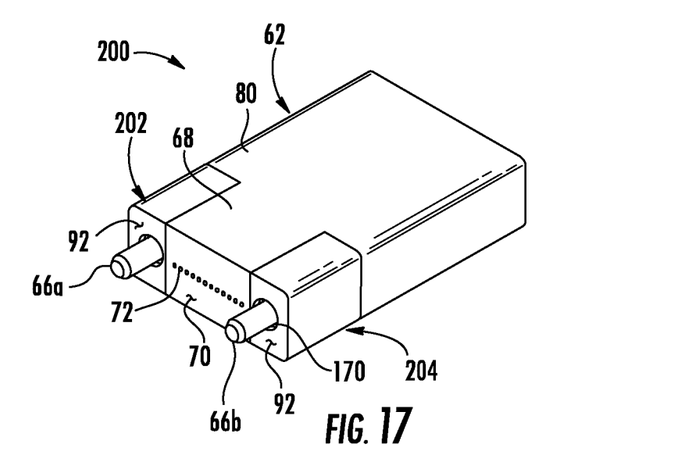
FIG. 17 is a perspective view of yet another embodiment of ferrule assembly for a fiber connector, such as the fiber optic connector of FIG. 1, with the ferrule assembly being shown in a male configuration.
Figure 18:
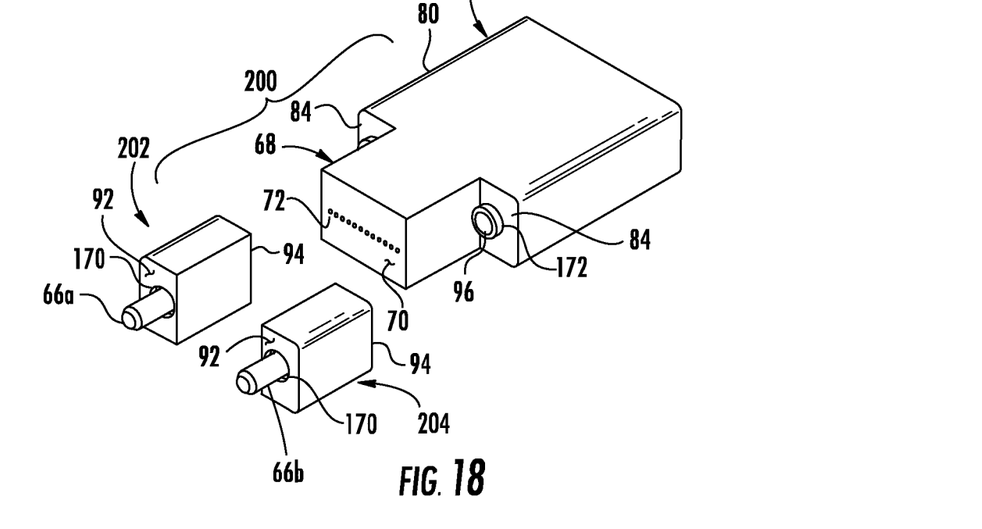
FIG. 18 is an exploded perspective view of the ferrule assembly of FIG. 17.

Now referring to FIGS. 17 and 18, a ferrule assembly 200 according to yet another embodiment is shown. The ferrule assembly 200 is similar to the ferrule assembly 150 (FIGS. 8-15), but includes separate first and second pin retainers 202, 204 for the respective first and second guide pins 66*a*, 66*b* rather than a single pin retainer. The first and second pin retainers 202, 204 are each received proximate the first portion 68 of the ferrule 62 and interface with the shoulder 84 in a manner similar to the pin retainer 64 in FIGS. 8-15.

Persons skilled in optical connectivity will appreciate additional variations and modifications of the devices and methods already described. For example, although the guide pins 66 are described above as being secured or coupled to the pin retainers 64, in other embodiments guide pins may be integrally formed with a pin retainer as a monolithic unit. Additionally, in some embodiments only a single guide pin may be provided. Finally, note that where a method claim below does not actually recite an order to be followed by its steps or an order is otherwise not required based on the claim language, it is no way intended that any particular order be inferred.

What is claimed is:

1. A ferrule assembly for a fiber optic connector, comprising:

a ferrule extending in a longitudinal direction, the ferrule having a first portion defining a front end face, a second portion defining at least one shoulder offset from the front end face in the longitudinal direction;

at least one pin retainer received over or proximate the first portion of the ferrule between the front end face and the at least one shoulder; and at least one guide pin coupled to or integral with the pin retainer;

wherein the at least one pin retainer can be removed from the ferrule, rotated to a reverse orientation, and re-installed on the ferrule to switch the ferrule assembly from a male configuration in which the at least one guide pin extends past a plane including the front end face of the ferrule to a female configuration in which the at least one guide pin extends into or along the second portion of the ferrule.

2. A ferrule assembly according to claim 1, wherein:

the at least one pin retainer has opposed first and second surfaces;

in the male configuration of the ferrule assembly, the first surface of the at least one pin retainer faces a forward direction and the second surface of the at least one pin retainer interfaces with the at least one shoulder of the ferrule; and in the female configuration of the ferrule assembly, the second surface of the at least one pin retainer faces a forward direction and the first surface of the at least one pin retainer interfaces with the at least one shoulder of the ferrule.

3. A ferrule assembly according to claim 2, wherein the at least one guide pin extends from within the at least one pin retainer between the first and second surfaces of the pin retainer.

4. A ferrule assembly according to claim 2, wherein the at least one pin retainer includes an opening extending between the first and second surfaces, the first portion of the ferrule extending through the opening of the at least one pin retainer in both the male and female configurations of the ferrule assembly.

5. A ferrule assembly according to claim 4, wherein the at least one pin retainer includes at least one inner surface extending between the first and second surfaces so as to define a portion of the opening, the at least one inner surface including a channel extending in the longitudinal direction, and the least one guide pin being partially received in the channel.

6. A ferrule assembly according to claim 5, wherein the first portion of the ferrule includes at least one side surface extending between the front end face and the at least one shoulder, the at least one side surface including a channel extending in the longitudinal direction, and further wherein the channel in the at least one side surface of the ferrule and the channel in the at least one inner surface of the at least one pin retainer together define at least one joint pin hole when the at least one pin retainer is received over the first portion of the ferrule, the least one guide pin occupying a portion of the at least one joint pin hole such that another portion of the at least one joint pin hole is empty.

7. A ferrule assembly according to claim 2, wherein the at least one pin retainer includes at least one pin hole extending between the first and second surfaces, the least one guide pin occupying a portion of the at least one pin hole in the at least one pin retainer such that another portion of the at least one pin hole in the at least one pin retainer is empty.

8. A ferrule assembly according to claim 7, wherein the at least one shoulder includes at least one boss, and further wherein the first and second surfaces of the at least one pin retainer each include at least one counter-bore configured to receive the at least one boss when interfacing with the at least one shoulder.

9. A ferrule assembly according to claim 2, wherein the at least one pin retainer includes an outer surface extending between the first and second surfaces and at least one engagement feature on the outer surface configured to facilitate removal of the at least one pin retainer from the first portion of the ferrule.

10. A ferrule assembly according to claim 1, wherein the ferrule further includes at least one pin hole extending into the second portion from the at least one shoulder, and further wherein the at least one guide pin extends into the at least one pin hole of the ferrule in the female configuration of the ferrule assembly.

11. A ferrule assembly according to claim 1, wherein the at least one pin retainer comprises a single pin retainer.

12. A ferrule assembly according to claim 11, wherein the at least one guide pin comprises first and second guide pins.

13. A ferrule assembly according to claim 1, wherein the at least one pin retainer comprises first and second pin retainers, and further wherein the at least one guide pin comprises first and second guide pins respectively coupled to or integral with the first and second pin retainers.

14. A ferrule assembly according to claim 1, wherein the at least one pin retainer is retained on the first portion of the ferrule only by friction in the male and female configurations of the ferrule assembly.

15. A ferrule assembly according to claim 1, wherein the at least one pin retainer and the ferrule include complementary engagement features for retaining the at least one pin retainer on the first portion of the ferrule in the male and female configurations of the ferrule assembly.

16. A fiber optic connector, comprising:

a housing; and a ferrule assembly at least partially received in the housing, the ferrule assembly comprising:

a ferrule extending in a longitudinal direction, the ferrule having a first portion defining a front end face, a second portion defining at least one shoulder offset from the front end face in the longitudinal direction;

at least one pin retainer received over or proximate the first portion of the ferrule between the front end face and the at least one shoulder; and at least one guide pin coupled to or integral with the pin retainer, the at least one guide pin projecting from the first surface of the at least one pin retainer;

wherein the at least one pin retainer can be removed from the ferrule, rotated to a reverse orientation, and re-installed on the ferrule to switch the ferrule assembly from a male configuration in which the at least one guide pin extends past a plane including the front end face of the ferrule to a female configuration in which the at least one guide pin extends into or along the second portion of the ferrule; and wherein the at least one pin retainer can be changed from the male configuration to the female configuration without removing the ferrule from the housing.

17. A method of changing the gender configuration of a fiber optic connector that includes a housing and a ferrule assembly at least partially received in the housing, wherein the ferrule assembly includes a ferrule extending in a longitudinal direction, at least one pin retainer received over or proximate a first portion of the ferrule between a front end face of the ferrule and at least one shoulder defined by a second portion of the ferrule, and at least one guide pin coupled to or integral with the pin retainer, the method comprising:

switching the ferrule assembly from a male configuration in which the at least one guide pin extends past a plane including the front end face of the ferrule to a female configuration in which the at least one guide pin extends into or along the second portion of the ferrule, or vice-versa, while the ferrule of the ferrule assembly is retained in the housing.

18. A method according to claim 17, wherein switching the ferrule assembly comprises:

removing the at least one pin retainer from the ferrule and the housing;

rotating the at least one pin retainer 180 degrees; and positioning the at least one pin retainer back on or proximate the first portion of the ferrule.

19. A method according to claim 18, wherein removing the at least one pin retainer comprises:

inserting a tool through a front opening of the housing and into a space defined between an outer surface of the at least one pin retainer and an inner surface of the housing; and     engaging a portion of the at least one pin retainer with the tool to facilitate the removal.

20. A method according to claim 18, wherein the housing includes a front end, a back end, a cavity extending between the front and back ends, and at least one opening extending through an outer surface of the housing into the cavity, and further wherein removing the at least one pin retainer comprises:

inserting a tool through the at least one opening in the outer surface of the housing; and     engaging a portion of the at least one pin retainer with the tool to facilitate the removal.

* * * * *